United States Patent [19]
Miyagawa

[11] Patent Number: 6,081,321
[45] Date of Patent: Jun. 27, 2000

[54] SOLID-STATE SCANNING-TYPE OPTICAL WRITING DEVICE

[75] Inventor: Yuta Miyagawa, Suita, Japan

[73] Assignee: Minolta Co., Ltd., Osaka, Japan

[21] Appl. No.: 09/084,175

[22] Filed: May 26, 1998

[30] Foreign Application Priority Data

May 30, 1997 [JP] Japan .................................. 9-142781

[51] Int. Cl.⁷ .............................. G03B 27/72; G02F 1/01
[52] U.S. Cl. .......................... 355/71; 347/239; 347/255; 359/254; 359/255; 355/32; 355/69
[58] Field of Search .................... 359/245, 254, 359/255; 355/67, 68, 69, 70, 71, 32, 37, 38; 347/136, 239, 255, 256

[56] References Cited

U.S. PATENT DOCUMENTS

| | | | |
|---|---|---|---|
| 4,100,573 | 7/1978 | Berger | 358/113 |
| 5,093,676 | 3/1992 | Matsubara et al. | 346/160 |
| 5,155,618 | 10/1992 | Matsubara et al. | 359/245 |
| 5,170,281 | 12/1992 | Kobayashi et al. | 359/245 |
| 5,191,408 | 3/1993 | Takanashi et al. | 359/255 |
| 5,247,387 | 9/1993 | Matsubara et al. | 359/245 |
| 5,390,000 | 2/1995 | Tanibata . | |
| 5,515,097 | 5/1996 | Munechika et al. | 347/241 |
| 5,721,609 | 2/1998 | Ishikawa et al. | 355/71 |
| 5,872,587 | 2/1999 | Fujita et al. | 347/239 |

FOREIGN PATENT DOCUMENTS 05196900   6/1993   Japan .

*Primary Examiner*—Alan A. Mathews
*Attorney, Agent, or Firm*—McDermott, Will & Emery

[57] ABSTRACT

Disclosed is a full color printer which comprises a optical writing head for writing a latent image onto a printing paper such as a silver salt-sensitive member. The optical writing head has an array of optical shutter elements each of which is made of PLZT. Red color light, green color light, and blue color light are sequentially projected to the light shutter element, and the drive voltage applied to the light shutter elements is changed synchronized with the color change. To prevent the generation of spike noise, the drive voltage is not changed suddenly, but is changed smoothly.

23 Claims, 8 Drawing Sheets

SOLID-STATE SCANNING-TYPE OPTICAL WRITING DEVICE

CROSS-REFERENCE TO RELATED APPLICATION

This application is based on Application No. HEI 9-142781 filed in Japan, the content of which is hereby incorporated by reference.

BACKGROUND OF THE INVENTION

1. Field of the Invention

The present invention relates to a solid-state scanning-type optical writing device. The present invention specifically relates to a solid-state scanningtype optical writing device for writing an image (latent image) on a photosensitive member by ON/OFF switching of light based on image data using an optical shutter element of PLZT.

2. Description of the Related Art

In general, various optical writing devices have been proposed which control the ON/OFF switching of single pixels using an optical shutter element of PLZT or the like to form an image (latent image) on an image carrying member such as printing paper used as a silver salt-sensitive member, or film or photosensitive member used for electrophotography. In such optical writing devices of the full color type, light exposure of a surface of a photosensitive member is accomplished by ON/OFF switching of an applied voltage to an optical shutter element to switch colors by high-speed rotation of a filter which separates the light into the three primary colors of red (R), green (G), and blue (B).

As shown in FIG. 8, transmission light intensity of the various colors red (R), green G), and blue (B) of the optical shutter element have different characteristics depending on the voltage applied to the optical shutter element. Transmission light intensity is a value obtained by dividing the exit light intensity from the optical shutter element by the entrance light intensity. As can be readily understood from FIG. 8, the optimum drive voltage (referred to as the half-wave voltage) is referred to as Rv (about 35.5 V) for red (R) light (wavelength: 650 nm), Gv (about 33 V) for green (G) light (wavelength: 550 nm), and Bv (about 29 V) for blue (B) light (wavelength: 450 nm). That is, there is a difference of several volts relative to the optimum drive voltage among the various colors.

In order to prevent irregular density of each color when switching the drive voltage of the optical shutter element to the optimum value for each color, pulse-like high-speed switching of a high voltage is necessary. There is a possibility, therefore, that high-voltage spike noise will be generated during switching. Spike noise, as is well known, is a phenomenon occurring when the response speed of a circuit changing a voltage is unable to track the change in voltage so as to cause a momentary excessive voltage. There is concern that the driver integrated circuit (IC) for the optical shutter element may be damaged when spike noise is generated.

SUMMARY OF THE INVENTION

An object of the present invention is to provide an improved solid-state scanning-type optical writing device.

Another object of the present invention is to provide a solid-state scanning-type optical writing device which does not generate spike noise which may damage the driver IC.

Still another object of the present invention is to provide a solid-state scanning-type optical writing device capable of applying a voltage near the optimum drive voltage for each color.

These objects are attained by the solid-state scanning-type optical writing device of the present invention which rotates a filter of the three primary colors to switch the light entering the optical shutter element on the one hand, and maintains voltage transition characteristics which change by an approximation curve including the optimum drive voltage of each color or voltage values near said optimum voltage values in a power source unit which applies the drive voltage to the drive unit of said optical shutter element so as to apply a voltage near an optimum drive voltage to said drive unit synchronously with the rotation of said color filter.

In the present invention, a voltage which changes by an approximation curve including an optimum drive voltage for each color or a voltage value near said optimum voltage value is applied to the drive unit of the optical shutter element synchronously with the rotation of the color filter. That is, the drive voltage is switched by a waveform expressing a smooth transition approaching a sine wave rather than a pulse wave, so as to prevent the possibility of generating high voltage spike noise. The present invention, therefore, maintains a constant contrast for each color by driving the optical shutter element with a voltage near the optimum drive voltage of each color, thereby eliminating concern of damage to the driver IC because high voltage spike noise is not generated.

These and other objects, advantages and features of the present invention will become apparent from the following description thereof taken in conjunction with the accompanying drawings which illustrate specific embodiments of the invention.

DETAILED DESCRIPTION OF THE PREFERRED EMBODIMENTS

The preferred embodiments of the solid-state scanning-type optical writing device of the present invention are described hereinafter with reference to the accompanying drawings.

Color Filter

Figure 1:
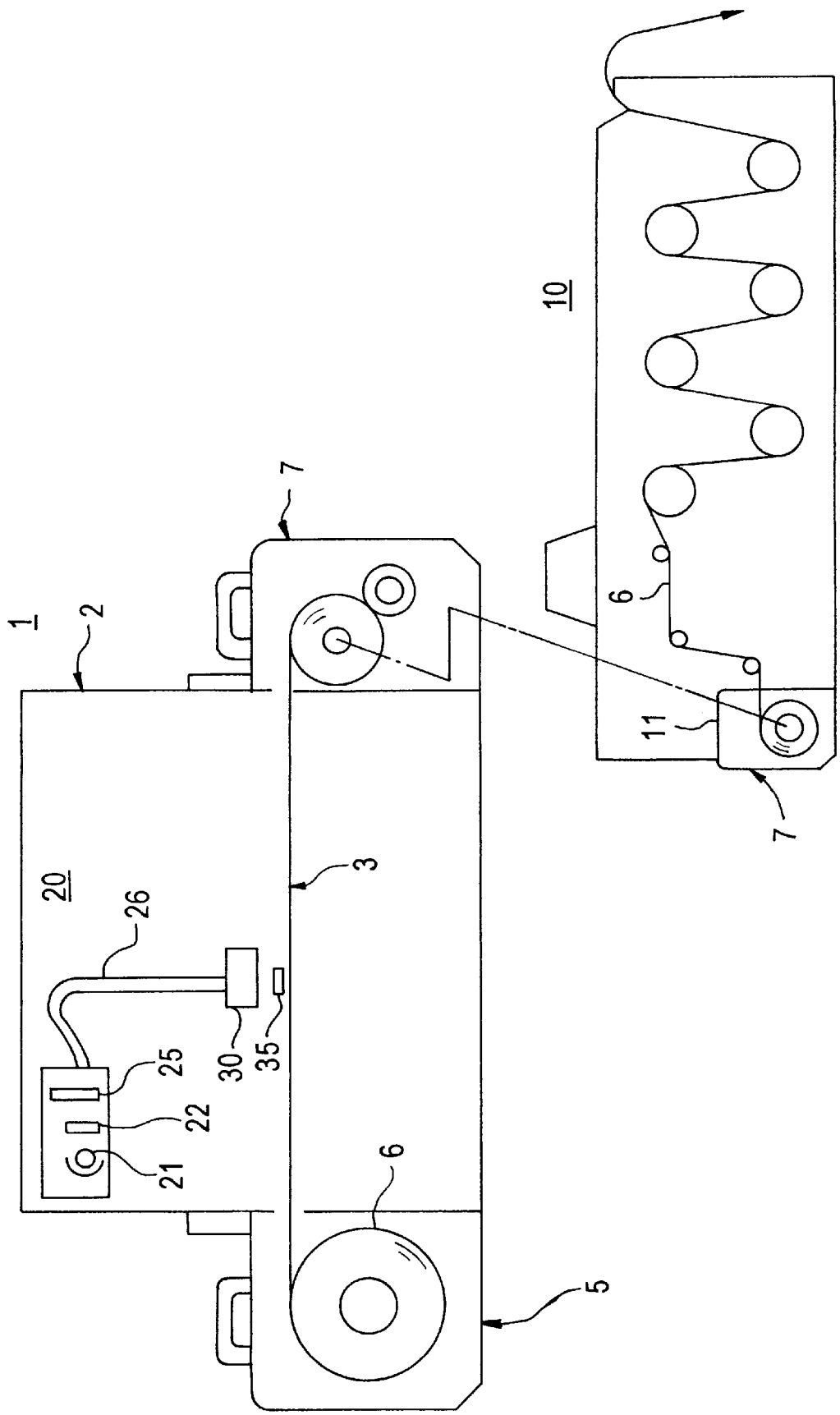
FIG. 1 briefly shows the construction of processor and printer provided with an optical writing head of an embodiment of the present invention.

FIG. 1 shows color printer 1 for photographic printing with an installed optical writing head 20 of an embodiment of the present invention, and print processor 10. Color printer 1 houses optical writing head 20 and printing paper transport unit 3 in a body 2. On the left side of the body 2 is installed a cartridge 5 capable of feeding out the printing paper 6 used as a silver saltsensitive member. The printing paper is accommodated in the cartridge 5 in a roll-like manner. On the right side of body 2 is installed a cartridge 7 for reeling in the printing paper 6. The feed out cartridge 5 and reel in cartridge 7 are removably installed in body 2. Printing paper 6 is directed from cartridge 5 to body 2, an image is printed thereon by optical writing device 20, and printing paper 6 is subsequently reeled into cartridge 7.

Print processor 10 performs processing such as developing, drying, and cutting the exposed printing paper 6. Cartridge 7 containing the reeled in exposed printing paper 6 is removed from body 2 and loaded in the feed unit 11 of print processor 10. The exposed printing paper 6 is pulled from cartridge 7, and developed, dried, and cut to predetermined length while being transported within the print processor 10, and is subsequently ejected from print processor 10.

Optical Writing Head

Figure 2:
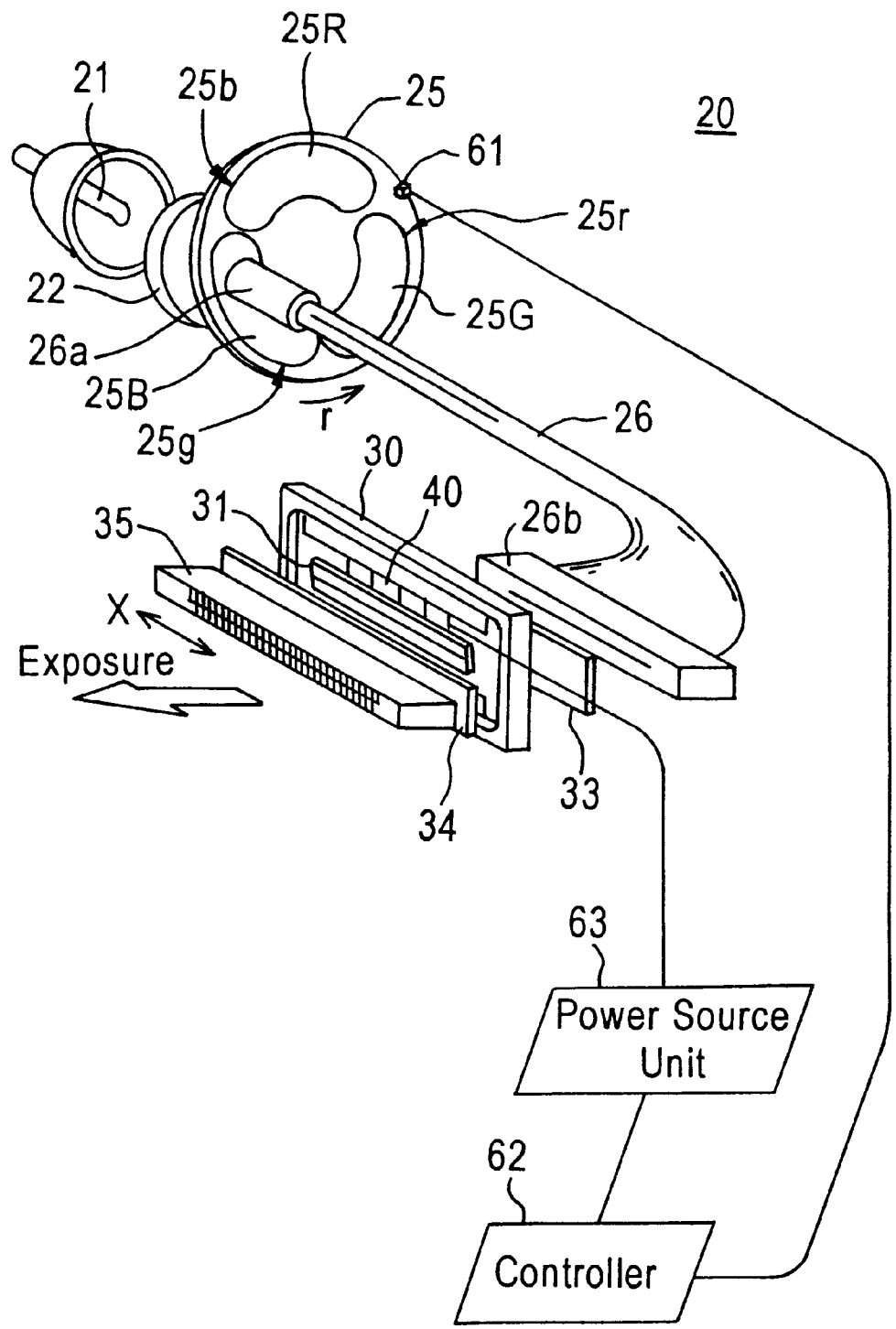
FIG. 2 is a perspective view of the aforesaid optical writing head.

FIG. 2 shows the full color optical writing head 20 installed in the aforesaid printer 1. Optical writing head 20 is used to form full color images (latent images) on printing paper 6, and briefly comprises halogen lamp 21, infrared cut filter 22, RGB filter 25, optical fiber array 26, optical shutter module 30, and image forming lens array 35. The forming (exposure) of a full color image is itself a well known process of reproducing said image by overlaying the color-separated red (R), green (G), and blue (B) images of the primary colors. Therefore, further discussion of this process is omitted.

RGB filter 25 is essentially a circular disk in shape, and provided with red (R) light transmission filter 25R, green (G) light transmission filter 25G, and blue (B) light transmission filter 25B equally spaced in the circumferential direction. RGB filter 25 is driven in rotation in the arrow r direction in the drawing synchronously with the writing by the optical shutter chips 31 described later, so as to change the transmitted color for each line. That is, RGB filter 25 changes the transmission color by repeating the sequence R, G, B. Optical fiber array 26 comprises a plurality of optical fibers. At one end 26a of optical fiber 26, optical fibers are bundled and facing RGB filter 25. At the other end 26b of optical fiber 26, optical fibers are arrayed in the main scan direction indicated by arrow X in the drawing, such that light is emitted linearly.

Optical shutter module 30 is provided with a plurality of optical shutter chips 31 formed of PLZT (plumbus lanthanum zirconate titanate) on a glass substrate or slit-like openings on a ceramic substrate. Optical shutter chips 31 are arranged in the main scan direction, and a plurality of optical shutter elements are formed on each optical shutter chip 31. A plurality of driver integrated circuits (IC) are provided adjacent to these optical shutter chips 31. Each optical shutter element comprises a pixel unit during writing, and among these optical shutter elements only those optical shutter elements corresponding to a written pixel are driven (i.e., turned ON) by driver IC 40. Polarizer 33 and analyzer 34 are respectively provided anteriorly and posteriorly to optical shutter module 30, respectively.

PLZT is a well known ceramic having light transmittance characteristics which include the electrooptic effect of a large Kerr constant; the light polarized at a right angle by polarizer 33 controls the rotation of the polarization plane via the ON/OFF switching of an electric field generated by a voltage applied to optical shutter chip 31. Light emitted from analyzer 34 is turned ON and OFF by controlling the polarization plane of the light. Light emitted from analyzer 34 forms an image on the aforesaid printing paper 6 via image forming lens array 35 so as to form a latent image.

The optical writing head 20 may be provided with an ND filter and color correction filter anteriorly and posteriorly to the infrared cut filter 22, and a slit panel may be interposed between optical fiber array 26 and polarizer 33.

Driver IC Construction and Operation

Figure 3:
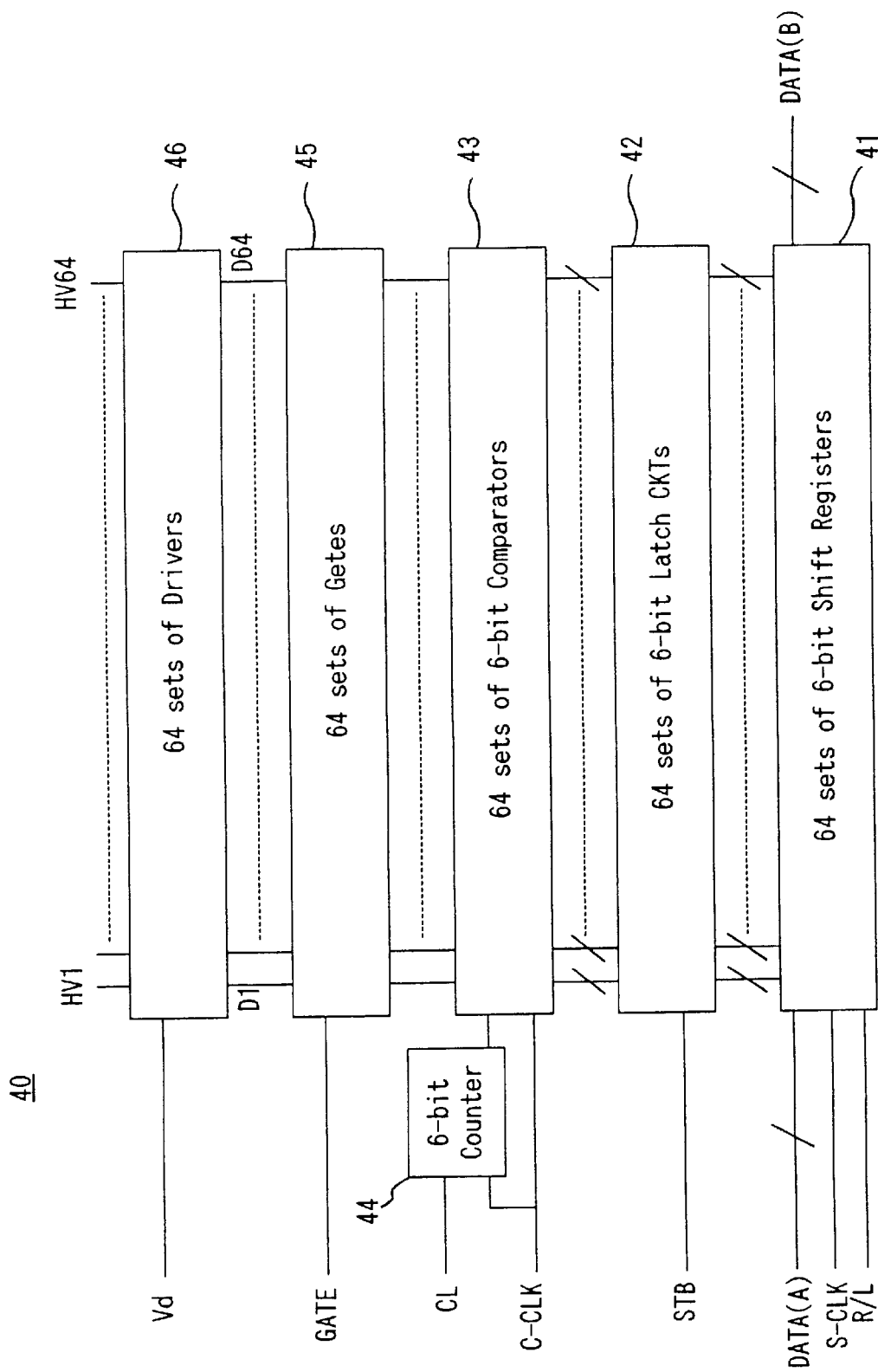
FIG. 3 is a block diagram of a driver IC for driving the aforesaid optical writing head.
Figure 4:
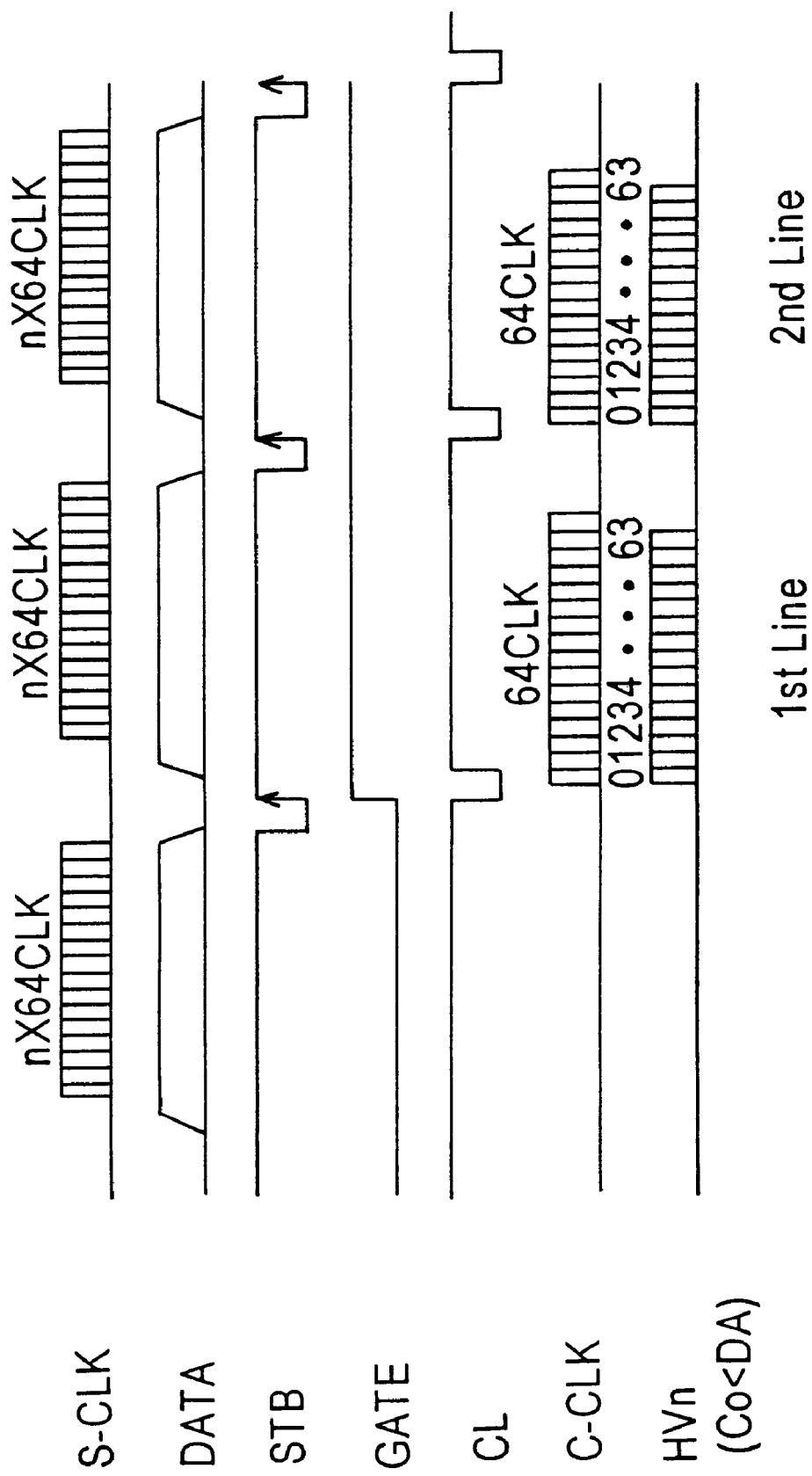
FIG. 4 is a timing chart showing the operation of the aforesaid optical writing head.

FIG. 3 shows the construction of driver IC 40 capable of halftone reproduction, and FIG. 4 shows a timing chart. Driver IC 40 uses n individual integrated circuits (IC) connected in a ladder chain, such that each IC drives 64 dots. Driver IC 40 comprises a 6-bit shift register 41, 6-bit latch circuit 42, 6-bit comparator 43, 6-bit counter 44, gate circuit 45, and driver circuit 46.

Images data DATA (A) and (B) are transmitted to shift register 41 synchronously with shift clock signal S-CLK based on shift signal R/L, and are latched in latch circuit 42 by strobe signal STB. In this way gradation of each pixel is set in latch circuit 42. Clock signals C-CLK are counted by counter 44, and comparator 43 compares the counter value with the value or the gradation latched in the latch circuit. Gate circuit 45 starts the output of signals D1–D63 to the driver circuit 46 synchronously with the start of the comparison by comparator 43. Furthermore, gate 45 stops the output of signals D1–D64 when the latched value and the counter value match based on the comparison by comparator 43. Counter 44 is cleared by clear signal CL.

A drive voltage Vd is applied to driver circuit 46, and the output HV1–HV64 are output to the optical shutter elements based on signals D1–D64 from gate circuit 45. That is, the optical shutter elements of the optical shutter chips 31 are turned ON by driver IC 40 only when the pixel corresponds to the image data DATA (pulse width).

Figure 8:
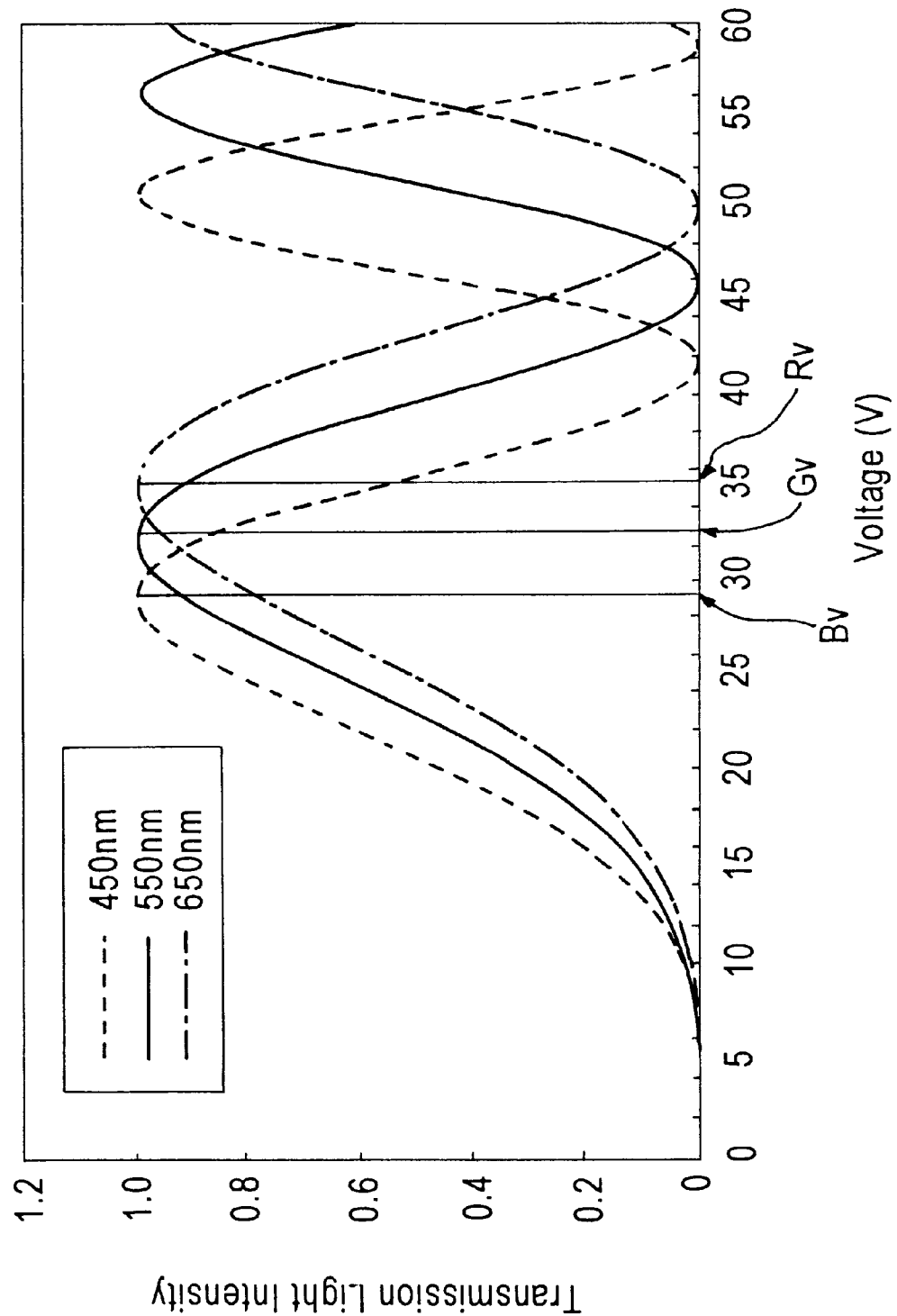
FIG. 8 is a graph illustrating the relationship between the transmission light intensity and the applied voltage.

As explained by referring FIG. 8, transmission light intensities of the various colors red (R), green G), and blue (B) of the optical shutter element have different characteristics depending on the voltage applied to the optical shutter element. It is desirable that the optimum drive voltages Rv, Gv, and Bv are applied as the drive voltage Vd during exposure of the respective colors to achieve uniform reproduction of contrast of each color. It is to be noted, however, that pulse-like high-speed switching of the drive voltage form Rv to Gv, Gv to Bv, and Bv to Rv generates spike noise as previously described.

Figure 5:
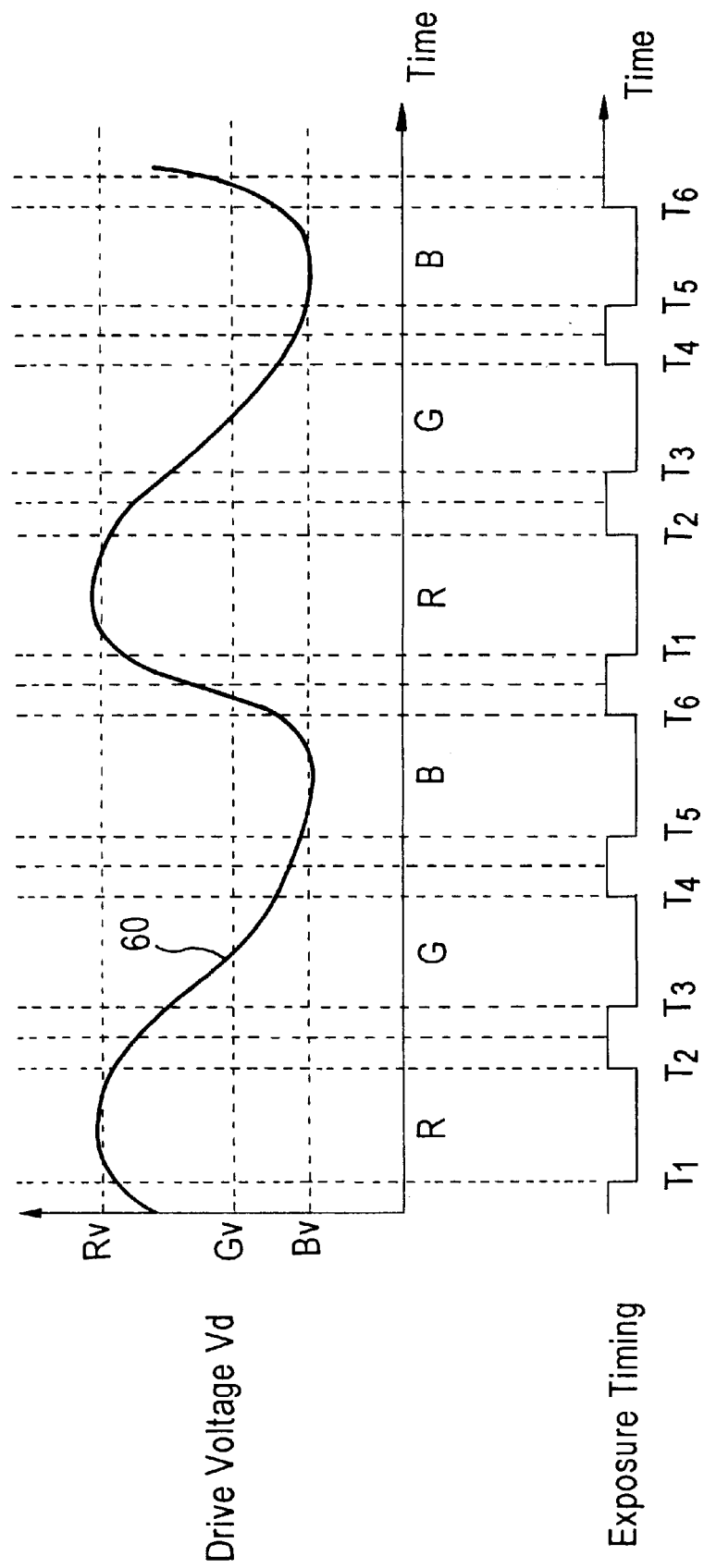
FIG. 5 is a chart showing drive voltage transition characteristics.

In the present embodiment, as shown in FIG. 5, the optical shutter elements of each optical shutter chip 31 are driven by voltage transition characteristics which change in an approximation curve including the optimum drive voltages Rv, Gv, and Bv (or voltage values near said optimum voltage values) relative to the respective three primary colors red (R), green (G), and blue (B). In FIG. 5, curve 60 represents the voltage transition characteristics, the R image is written during time interval T1-T2, the G image is written in the time interval T3-T4, and the B image is written during the time interval T5-T6.

In order to control the timing of the aforesaid voltage application, notches 25r, 25g, and 25b are formed outside the circumference of RGB filter 25, and these notches 25r, 25g, and 25b are detected by a sensor 61, as shown in FIG. 2. The detection timing by which the notches 25r, 25g, and 25b are detected by the sensor 61 respectively correspond to the time periods T1, T3, and T5 shown in FIG. 5. The detection signal of sensor 61 is input to a controller 62 which controls the power source unit 63 so as to output a voltage value corresponding to the aforesaid voltage transition characteristics with a predetermined timing. The voltage output from the power source unit 63 is input to each driver IC 40 as a drive voltage Vd.

According to the aforesaid controls, the drive voltage of the optical shutter elements is switched by a waveform expressing a smooth transition approaching a sine wave rather than a pulse wave, so as to prevent the possibility of high voltage spike noise being input to the driver IC 40. Furthermore, since the optical shutter elements are driven by the optimum or near optimum voltage value for each color, high quality images can be produced having excellent contrast for each color and without uneven density for each color.

Other Embodiments

The solid-state scanning-type optical writing device of the present invention is not limited to the previously described embodiment, and the present invention may be variously modified insofar as such modification does not depart from the scope of the invention.

Figure 6:
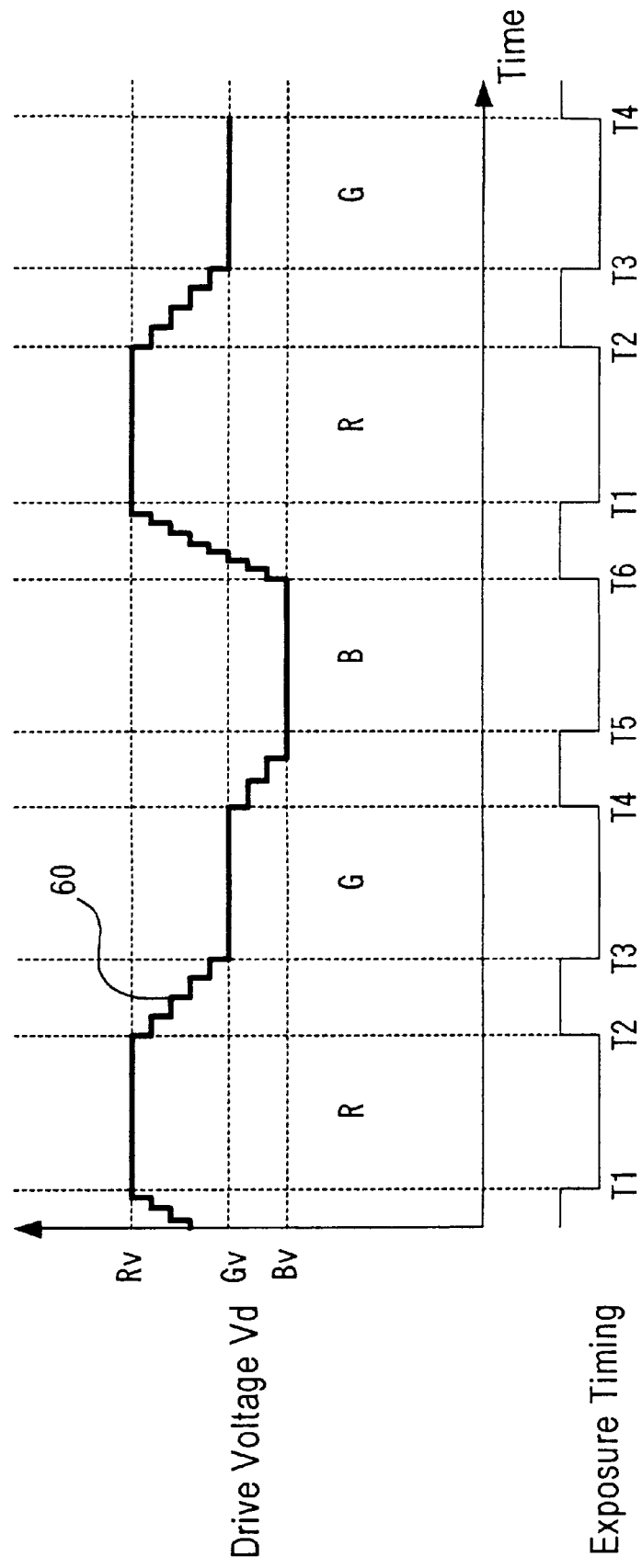
FIG. 6 is a chart showing another example of drive voltage transition characteristics.
Figure 7:
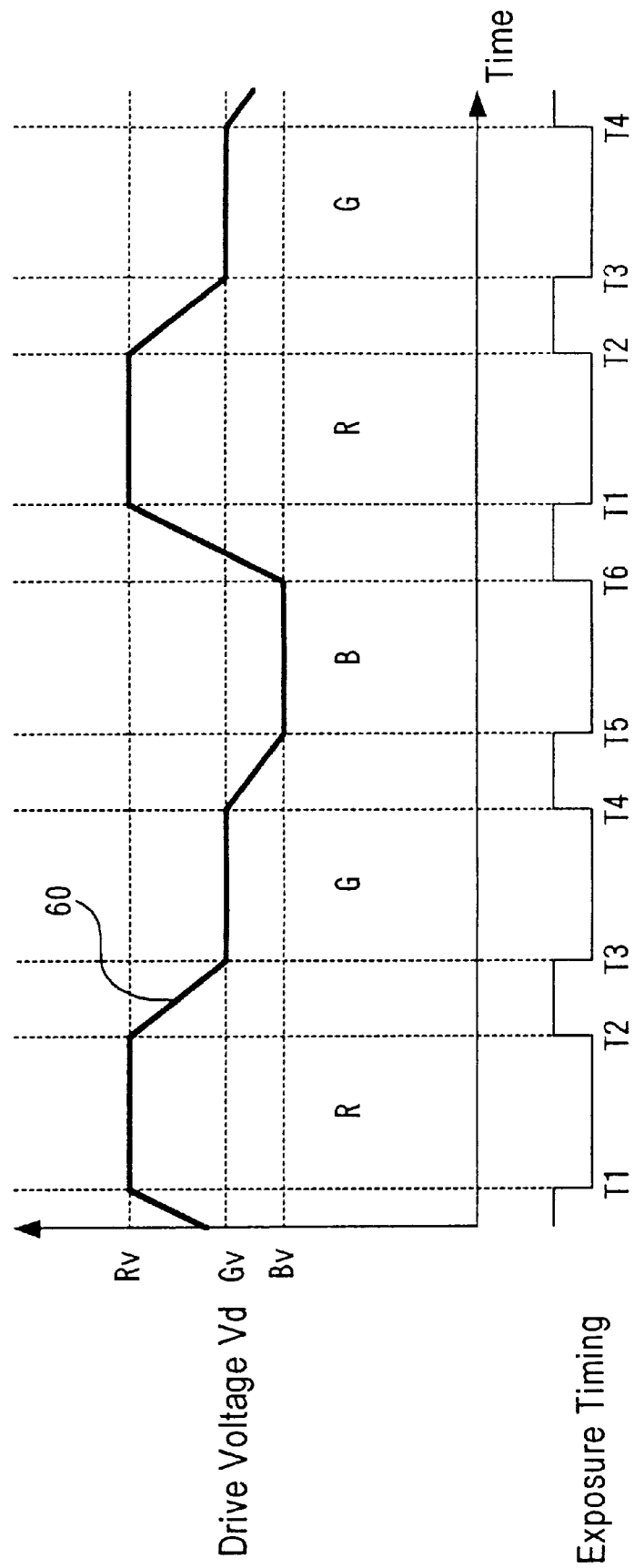
FIG. 7 is a chart showing still another example of drive voltage transition characteristics.

For example, although a drive voltage having the voltage transition characteristics shown in FIG. 5 is used in the previously described embodiment, the present invention is not limited to such a drive voltage inasmuch as drive voltages having the voltage transition characteristics shown in FIGS. 6 and 7 may also be applicable. FIG. 6 shows a first modification of the voltage transition characteristics of the drive voltage, and FIG. 7 sows a second modification of the voltage transition characteristics of the drive voltage. The first modification is a form which prevents the generation of spike noise by changing the drive voltage in multiple steps. Although the amount of voltage change per step is dependent on the characteristics of the driver circuit IC 40 used, experiments by the present inventors indicate that spike noise generation can be reliably prevented when the amount of voltage change per step is less than about several millivolts. The second modification prevents the generation of spike noise by minimizing the amount of voltage change per unit time when switching the drive voltage. These modifications also provide a smooth transition in drive voltage compared to conventional modes of switching drive voltages.

Further to this, the structure for changing transmission color light color may not be limited as the aforementioned embodiment. For example, the structure disclosed in U.S. Pat. No. 5,390,000 may be applicable. Moreover, as easily understood from FIG. 8, a plate (or element) made of PLZT may be used as a structure for changing transmission color light. That is, for example, by applying about 50 volt to the plate, blue (B) light can pass it and red (R) and green (g) lights hardly pass it, and therefore, nearly only blue (B) light is output from the plate. By changing the magnitude of the applied voltage, transmission color light can be selectively changed. It is desirable for preventing generation of spike noise to smoothly change the magnitude of the applied voltage as the smooth transition in drive voltage of the aforementioned embodiments.

In addition to PLZT, other devices usable as an optical shutter element include liquid crystal shutter (LCS) elements, deformable devices (DMD) and the like. The present invention is not only applicable to optical writing device which write images on printing paper using a silver salt sensitive member, but is also applicable to writing devices which write images on silver salt film or an electrophotographic photosensitive member, or image projection devices which project an image on a display.

Although the present invention has been fully described by way of examples with reference to the accompanying drawings, it is to be noted that various changes and modification will be apparent to those skilled in the art. Therefore, unless otherwise such changes and modifications depart from the scope of the present invention, they should be construed as being included therein.

What is claimed is:

1. An optical modulating device comprising:
   an optical modulating element which modulates a light that enters thereto, said optical modulating element having characteristics differing in output wavelength depending on a value of an applied voltage; and
   a voltage applying unit which applies voltage to said optical element, said voltage having a transition characteristic which changes the voltage between a first voltage and a second different voltage in a waveform approaching a sine wave.

2. The optical modulating device of claim 1, wherein said voltage changes between the first voltage and the second voltage a plurality of times.

3. The optical modulating device of claim 2, wherein a first optimal voltage for a first wavelength of light and a second optimal voltage for a second wavelength of light are included in the voltage changing from the first voltage to the second voltage.

4. The optical modulating device of claim 1, wherein said optical modulating element is an optical filter which changes the wavelength of light that passes therethrough depending on the applied voltage.

5. The optical modulating device of claim 1, wherein said optical modulating element is an optical shutter element which changes the intensity of light that passes therethrough depending on the applied voltage.

6. The optical modulating device of claim 1, wherein the voltage is gradually changed from the first voltage to the second voltage.

7. The optical modulating device of claim 1, wherein the voltage is changed from the first voltage to the second voltage in multiple steps.

8. An optical modulating device comprising:
   changing means for changing color of light periodically;
   an optical modulating element for modulating the light; and
   a driver which applies a driver voltage to said optical modulating element, said voltage having a transition characteristic which changes the voltage smoothly in synchronization with the change of color of light.

9. The optical modulating device of claim 8, wherein said changing means includes alight source and optical color filters of different colors.

10. The optical modulating device of claim 9, wherein said voltage is changed in a predetermined range, and optimal voltages for the colors corresponding to said optical filters are in said predetermined range.

11. The optical modulating device of claim 9, wherein said optical color filters are for passing red color light, green color light, and blue color light, respectively.

12. The optical modulating device of claim 11, wherein said optical color filters are provided on a rotatable disk.

13. A method for driving an optical modulating element, said method comprising the steps of:
   (a) entering light to said optical modulating element; and
   (b) changing a voltage applied to the optical modulating element smoothly, and thus changing color of light output from said optical modulating element.

14. The method of claim 13, wherein the voltage is gradually changed from a first voltage to a second voltage in the step (b).

15. The light modulating device of claim 13, wherein the voltage is changed from a first voltage to a second voltage in multiple steps in the step (b).

16. A method for modulating an optical modulating element, said method comprising the steps of:

(a) changing a color of light entering said optical modulating element; and (b) changing a voltage applied to the optical modulating element smoothly, in synchronization with the change of the color of the light.

17. The method of claim 16, wherein the voltage is gradually changed from a first voltage to a second voltage in the step (b).

18. The light modulating device of claim 16, wherein the voltage is changed from a first voltage to a second voltage in multiple steps in the step (b).

19. An optical modulating device comprising:

an optical modulating element which modulates a light that enters thereto, said optical modulating element having characteristics differing in output wavelength depending on a value of an applied voltage; and a voltage applying unit which applies voltage to said optical element, said voltage having a transition characteristic which changes the voltage smoothly, preventing noise spikes in the voltage, wherein said voltage changes in a predetermined range, and a first optimal voltage for a first wavelength of light and a second optimal voltage for a second wavelength of light are in the predetermined range.

20. The optical modulating device of claim 19, wherein said optical modulating element is an optical filter which changes the wavelength of light that passes therethrough depending on the applied voltage.

21. The optical modulating device of claim 19, wherein said optical modulating element is an optical shutter element which changes the intensity of light that passes therethrough depending on the applied voltage.

22. The optical modulating device of claim 19, wherein the voltage is gradually changed from a first voltage to a second voltage.

23. The optical modulating device of claim 19, wherein the voltage is changed from a first voltage to a second voltage in multiple steps.

* * * * *